United States Patent Office 3,369,025
Patented Feb. 13, 1968

3,369,025
3-PYRIDYLMETHYL PHENOXY(PHENYLTHIO AND ANILINO)ALKANOATES
William A. Bolhofer, Frederick, Pa., assignor to Merck & Co., Inc., Rahway, N.J., a corporation of New Jersey
No Drawing. Filed July 30, 1965, Ser. No. 476,191
6 Claims. (Cl. 260—295)

ABSTRACT OF THE DISCLOSURE

Pyridylmethyl esters of (1) phenoxylalkanoic acids, (2) phenylthioalkanoic acids and (3) anilinoalkanoic acids wherein the benzene ring is either unsubstituted or may be substituted by halogen, nitro, alkyl, cycloalkyl, alkenyl, alkoxy, alkylthio, alkylsulfonyl, aryl, aralkyl, aralkoxy, arylcarbonyl, methyl, arylamino, alkanamido or a divalent hydrocarbylene chain. The said esters are hypocholesterolemic agents which are useful in the treatment of atherosclerosis.

---

The instant products are prepared by the reaction of an appropriate phenoxyalkanoic acid halide or by the reaction of the corresponding phenylthio- or anilino-substituted alkanoic acid halide with 3-hydroxymethylpyridine.

This invention relates to a new class of 3-pyridylmethyl phenoxy(phenylthio and anilino)alkanoates and to the nontoxic, pharmacologically acceptable acid addition salts thereof, which have valuable hypocholesterolemic activity and which are thus useful in the treatment of atherosclerosis.

Clinical studies show that cholesterol apparently plays a major role in the formation of atherosclerotic plaques by accelerating the deposition of blood lipids in the arterial wall. It is the purpose of this invention to disclose a new class of chemical compounds which effectively reduces the concentration of cholesterol and other lipids in blood serum and thus ameliorates the condition usually associated with lipid deposition.

The 3-pyridylmethyl phenoxy(phenylthio and anilino) alkanoates of this invention are compounds having the following structural formula:

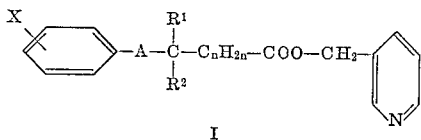

I wherein A is a member selected from the group consisting of oxygen, sulfur and imino; $R^1$ and $R^2$ represent similar or dissimilar members selected from the group consisting of hydrogen, lower alkyl, for example, methyl, ethyl, isopropyl, etc., halo lower alkyl, for example, chloromethyl, trifluoromethyl, 2,2,2-trifluoroethyl, etc. and, taken together with the carbon to which they are attached, the $R^1$ and $R^2$ radicals may be joined to form a cycloalkyl ring, for example, a cycloalkyl ring containing from five to six nuclear carbon atoms, such as cyclopentyl, cyclohexyl, etc., with the proviso that $R^1$ and $R^2$ cannot both be hydrogen at the same time; X is selected from the group consisting of hydrogen, halogen, for example, chlorine, bromine, fluorine, etc., nitro, alkyl, for example, lower alkyl, such as methyl, ethyl, propyl, butyl, etc., cycloalkyl, for example, cycloalkyl containing from five to six nuclear carbon atoms, such as cyclopentyl, cyclohexyl, etc., alkenyl, for example, lower alkenyl, such as vinyl, allyl, propenyl, etc., alkoxy, for example, lower alkoxy, such as methoxy, ethoxy, propoxy, etc., alkylthio, for example, lower alkylthio, such as methylthio, etc., alkylsulfonyl, for example, lower alkylsulfonyl, such as methylsulfonyl, etc., aryl, for example, phenyl, tolyl, xylyl, etc., aralkyl, for example, benzyl, para-methylbenzyl, phenenthyl, etc., aralkoxy, for example, benzyloxy, phenethyloxy, etc., arylcarbonylmethyl, for example, phenylcarbonylmethyl, etc., arylamino, for example, anilino, N-methylanilino, etc., lower alkanoic acid amido, for example, acetamido, etc. and an hydrocarbylene chain (i.e., a divalent organic radical composed solely of carbon and hydrogen) containing from three to four carbon atoms between their points of attachment, for example, trimethylene, i.e., $-CH_2-CH_2-CH_2-$, tetramethylene, i.e., $-CH_2-CH_2-CH_2-CH_2-$, 1,3-butadienylene, i.e., $-CH=CH-CH=CH-$ etc. and $n$ is an integer having a value of zero to four.

A preferred embodiment of the invention relates to the 3-pyridylmethyl phenoxy(phenylthio and anilino)alkanoates having the following structural formula:

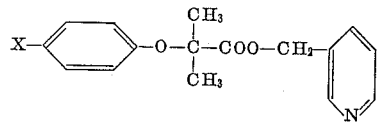

wherein X is a member selected from the group consisting of halogen, for example, chlorine, etc. and lower alkyl, for example, methyl, ethyl, propyl, butyl, etc. This class of products exhibits particularly good hypocholesterolemic activity and represents a preferred subgroup of compounds within the scope of this invention.

Included within the scope of this invention are the nontoxic, pharmacologically acceptable acid addition salts of the instant products (I) which may be formed by treating the said products with an acid having a pharmacologically acceptable anion. In general, any acid which will form an acid addition salt with the foregoing 3-pyridylmethyl phenoxy(phenylthio and anilino)alkanoates (I) and whose pharmacological properties will not cause an adverse physiological effect when ingested by the body system is considered as being within the scope of this invention; suitable acids thus include, for example, inorganic acids such as hydrochloric acid, hydrobromic acid, sulfuric acid, phosphoric acid, etc. and organic acids such as acetic acid, propionic acid, butyric acid, citric acid, tartaric acid, etc.

The 3-pyridylmethyl phenoxy(phenylthio and anilino) alkanoates (I) of the invention are conveniently prepared by the reaction of a suitable phenoxy(phenylthio or anilino)alkanoic acid halide with 3-hydroxymethylpyridine. The following equation illustrates the reaction:

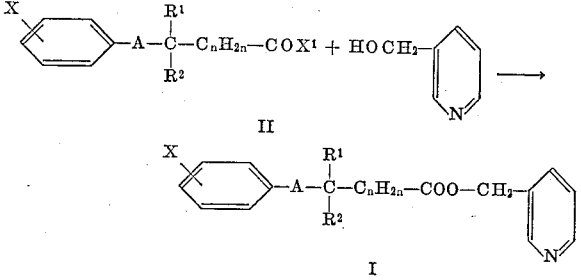

wherein A, $R^1$, $R^2$, X and $n$ are as defined above and $X^1$ represents halogen, for example, chlorine, bromine, etc. The choice of a suitable reaction medium in which to conduct the process is not a particularly critical aspect of the invention and, in general, any solvent in which the reactants are reasonably soluble and which is substantially inert with respect to the reactants may be employed; however, pyridine has proved to be a particularly advantageous medium in which to conduct the reaction. Also, it has been found that the process is favored by the application of a cooling means as, for example, by conducting the reaction in an ice bath over a protracted period.

The phenoxy(phenylthio and anilino)alkanoic acid halide reactants, identified as compound II in the above equation, are prepared by the halogenation of the corresponding carboxylic acid. Suitable halogenating agents include thionyl chloride, phosphorus trichloride and phosphorus oxychloride. The following equation wherein the halogenating agent employed is phosphorus oxychloride, illustrates this method of preparation:

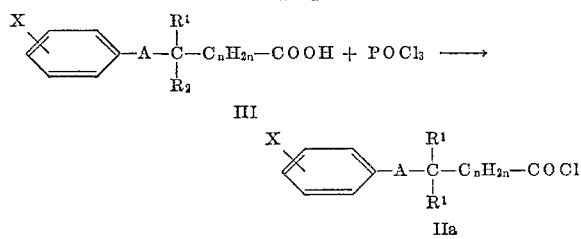

wherein A, $R^1$, $R^2$, X and $n$ are as defined above. A modification of the foregoing synthesis consists in first forming the corresponding sodium salt of the phenoxyalkanoic acid and then treating the said salt with phosphorus oxychloride, phosphorus trichloride or thionyl chloride to produce the desired phenoxyalkanoic acid halide (IIa).

The phenoxyalkanoic acid intermediates (III) from which the corresponding acid halide derivatives (II and IIa are prepared may be synthesized by methods well known to those skilled in the art. When, for example, the radical A in the planar formula for the phenoxyalkanoic acid intermediates (III, supra) is oxygen or sulfur and $R^1$ and $R^2$ represent a member selected from the group consisting of hydrogen and lower alkyl the corresponding phenoxy(and phenylthio)alkanoic acids (IIIa) are prepared by the reaction of an alkali metal salt of a suitable phenol or thiophenol with an alkyl ester of an haloalkanoic acid in an alcoholic solution and the resulting ester derivative thus formed is saponified to obtain the desired acid (IIIa). The following equation illustrates the process:

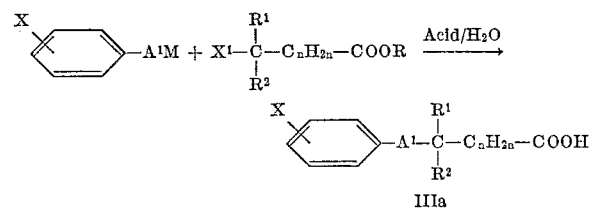

wherein $R^1$, $R^2$, X, $X^1$, and $n$ are as defined above; $A^1$ is oxygen or sulfur; R is alkyl such as methyl, ethyl, etc. Suitable acids and bases which may be used in the process include, for example, hydrochloric acid, sodium hydroxide, etc. and M is the cation derived from an alkali metal hydroxide, carbonate, etc. such as the cation derived from sodium hydroxide, sodium carbonate, etc.

Those phenoxyalkanoic acid intermediates (IIIb) wherein the radical A represents nitrogen and $R^1$ and $R^2$ represent a member selected from the group consisting of hydrogen and lower alkyl may be prepared by the hydrolysis of an appropriate anilino substituted alkanoic acid amide or anilino substituted alkylnitrile to obtain the corresponding carboxylic acid. The following equation illustrates the reaction:

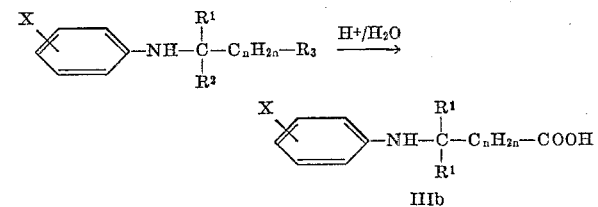

wherein $R_1$, $R_2$, X and $n$ are as defined above; $R_3$ is a member selected from the group consisting of cyano and amido and $H^+$ is the cation derived from an organic or inorganic acid, for example, hydrochloric acid.

Those phenoxyalkanoic acid intermediates (IIIc) wherein $R^1$ and $R^2$ are combined to form a cycloalkyl ring are prepared by the reaction of a suitable phenol, thiophenol or aniline with cyclohexanone or cyclopentanone and chloroform in the presence of a strong base. The following equation illustrates the reaction:

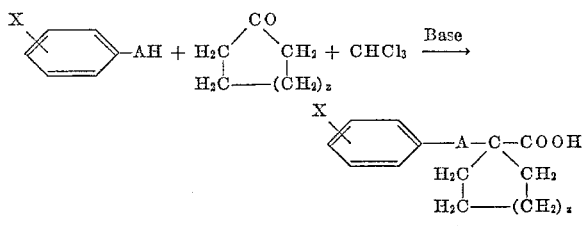

wherein A and X are as defined above and z is an integer having a value of one to two. Suitable bases which may be used in the process include, for example, sodium hydroxide and potassium hydroxide.

The following examples are illustrative of the 3-pyridylmethyl phenoxy(phenylthio and anilino)alkanoates (I) of the invention and the method by which they are prepared. The examples are illustrative only and the invention should not be construed as being limited thereto.

EXAMPLE 1

*3-pyridylmethyl 2-(4-chlorophenoxy)-2-methylpropionate hydrochloride*

STEP A.—2-(4-CHLOROPHENOXY)-2-METHYLPROPIONYL CHLORIDE

A solution of 21.5 g. (0.1 mole) of 4-chlorophenoxyisobutyric acid and 24 ml. of thionyl chloride in 200 ml. of benzene is heated under reflux for 1½ hours. The benzene is removed by vacuum concentration by means of a water aspirator; 50 ml. of benzene is added to the residue and the solution is again concentrated. The residue obtained is identified as 2 - (4 - chlorophenoxy)2-methylpropionyl chloride.

STEP B.—3-PYRIDYLMETHYL 2-(4-CHLOROPHENOXY)-2-METHYLPROPIONATE

2 - (4 - chlorophenoxy)-2-methylpropionyl chloride (18.6 g., 0.08 mole) is cooled to 0° C. and added to a solution of 3-hydroxymethylpyridine (8.7 g., 0.08 mole) in 10 ml. of pyridine in an ice bath. The resulting suspension is allowed to stand in a refrigerator overnight. The solid thus formed, which is completely water soluble, is filtered off and discarded and the filtrate is evaporated in vacuo to strip off pyridine. The oily residue is then taken up in ether and the ether solution washed with 3% sodium hydroxide, water and then dried over magnesium sulfate. The ether is evaporated in vacuo to obtain 3-pyridylmethyl 2-(4-chlorophenoxy)-2-methylpropionate as a non-volatile residue.

STEP C.—3-PYRIDYLMETHYL 2-(4-CHLOROPHENOXY)-2-METHYLPROPIONATE HYDROCHLORIDE

The 3-pyridylmethyl 2-(4-chlorophenoxy)-2-methylpropionate obtained in Step B is dissolved in ether and dry hydrogen chloride is bubbled through the solution to yield 15 g. of 3-pyridylmethyl 2-(4-chlorophenoxy)-2-methylpropionate hydrochloride, M.P. 110–8° C. After two recrystallizations from ethyl acetate 10 g. of pure product is obtained, M.P. 115.5–118.5° C.

Analysis for $C_{16}H_{16}ClNO_3 \cdot HCl$.—Calculated: C, 56.15; H, 5.01; N, 4.09. Found: C, 56.30; H, 5.12; N, 4.00.

By substituting the appropriate phenoxy(phenylthio or anilino)alkanoic acid starting material and an appropriate acid for the 4-chlorophenoxyisobutyric acid and hydrogen chloride reactants of Example 1, Steps A and C, respectively, and following substantially the procedure described in Steps A, B and C of that example, all of the 3-pyridylmethyl phenoxy(phenylthio or anilino)alkanoic acid esters and the corresponding acid addition salts thereof may be obtained. However, it is to be understood that the step of obtaining the acid addition salts is an optional one which may or may not be employed; thus, if the esterified product (Ia, infra) is desired the said 3-pyridylmethyl phenoxy(phenylthio or anilino)alkanoic acid esters may be isolated as such by the conversion of the phenoxy (phenylthio or anilino)alkanoic acid starting material to its corresponding acid chloride according to the procedure of Example 1, Step A, and then treating the acid chloride thus obtained with the 3-hydroxymethyl pyridine reactant according to the procedure described in Example 1, Step B. Alternatively, if the acid addition salt of the ester product (Ia) is desired the said ester is then treated with a suitable acid to obtain the corresponding acid addition salt as described in Example 1, Step C.

The following equation illustrates the reaction of Example 1, Steps A, B and C, together with Table I (infra), depict the phenoxy(phenylthio and anilino)alkanoic acid reactants (IIId) of the process and the corresponding 3-pyridylmethyl phenoxy(phenylthio and anilino)alkanoates and corresponding acid addition salts produced thereby:

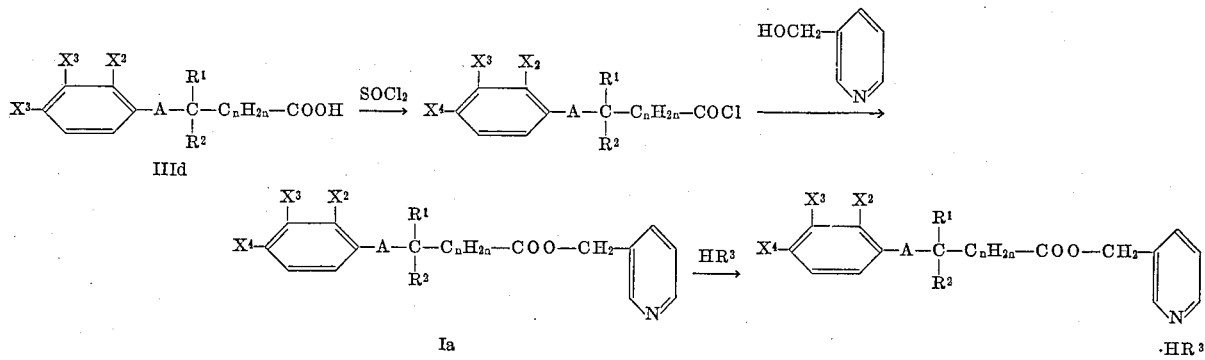

TABLE I

| Ex. | $-C_nH_{2n}-$ | $R^1$ | $R^2$ | $R^3$ | $X^2$ | $X^3$ | $X^4$ | A | M.P. of IIId (° C.) |
|---|---|---|---|---|---|---|---|---|---|
| 2 | | $-CH_3$ | $-CH_3$ | bromide | H | Cl | H | O | 59–60 |
| 3 | | $-CH_3$ | $-CH_3$ | chloride | H | H | Cl | S | 99 |
| 4 | | $-CH_3$ | $-CH_3$ | chloride | H | H | $-OCH_3$ | O | 58–60 |
| 5 | | $-CH_3$ | $-CH_3$ | citrate | H | H | $-O-CH_2-\bigcirc$ | O | 135–237 |
| 9 | $-CH_2-$ | H | H | bromide | H | H | Cl | O | 135–137 |
| 7 | | $-CH_3$ | $-CH_3$ | tartrate | H | H | $-C_2H_5$ | O | 77–79 |
| 8 | | $-CH_3$ | $-CH_3$ | chloride | H | H | $-NH-\bigcirc$ | O | 109–111 |
| 9 | | $-CH_3$ | $-CH_3$ | acetate | Cl | H | H | O | 74.5–76 |
| 10 | | $-CH_3$ | $-CH_3$ | sulfate | H | H | $-\bigcirc$ | O | 167.5–169 |
| 11 | | $-CH_3$ | $-CH_3$ | citrate | H | H | $-\bigcirc_S$ | O | 115–116.5 |
| 12 | | $-CH_3$ | $-CH_3$ | acetate | H | H | $-CH=CH-\bigcirc$ | O | 197–200 |
| 13 | | $-CH_3$ | $-CH_3$ | chloride | H | H | $-CH_2-CH_2-\bigcirc$ | O | 113.5–116 |
| 14 | | $-CH_3$ | H | chloride | H | Cl | H | O | 112–114 |
| 15 | | $-CH_3$ | $-CH_3$ | tartrate | H | H | $-NH-CO-CH_3$ | O | 171–173 |
| 16 | | $-CH_3$ | $-CH_3$ | bromide | H | H | $-CH_2-CO-\bigcirc$ | O | 124–126 |
| 17 | | $-CH_3$ | $-CH_3$ | citrate | H | H | Cl | NH | 141–143 |
| 18 | | H | H | chloride | H | H | Cl | O | 160–162 |
| 19 | | $-CH_2-CH_2-CH_2-CH_2-CH_2$ | | tartrate | H | H | Cl | O | 143–145 |
| 20 | | H | $-CH_3$ | chloride | H | H | Cl | O | 113.5–115 |
| 21 | | $-CH_3$ | $-C_2H_5$ | phosphate | H | H | Cl | O | 87 |
| 22 | | $-CH_3$ | $-CH_3$ | bromide | $-SCH_3$ | H | H | O | 82–84 |
| 23 | $-(CH_2)_2-CH(CH_3)-$ | H | H | acetate | H | H | Cl | O | 75–76 |
| 24 | $-CH_2-CH(CH_3)-$ | H | H | chloride | H | H | Cl | O | 68.5–71 |
| 25 | | H | $-CH(CH_3)_2$ | acetate | H | H | Cl | O | 93–95 |
| 26 | | $-CH_3$ | H | propionate | H | H | H | S | 20.6 |
| 27 | | $-C_2H_5$ | H | bromide | H | Cl | H | O | 72–74 |
| 29 | | $-CH_3$ | $-CH_3$ | tartrate | H | H | $-NO_2$ | O | 123–124 |
| 30 | | H | $-CH_3$ | citrate | H | H | $-CH_3$ | S | 77.5–78.5 |
| 31 | | $-CH_3$ | $-CH_3$ | bromide | H | H | $-SOCH_3$ | O | 179–181 |
| 32 | | $-CH_3$ | $-CH_3$ | chloride | H | $-CF_3$ | H | O | 61–62 |

There is no clear agreement about the actual role of cholesterol synthesis in the localization of atherosclerotic plaques but numerous studies support the concept that cholesterol plays a major role in the pathogenesis of atherosclerosis because along with other lipids and fibrin it is the substance that accumulates in the arterial intima and subintima and produces arterial obstruction and damage.

Since cholesterol is present to some extent in all ordinary diets and since it is also synthesized by various body organs from intermediates of metabolic origin. the development of some chemotherapeutic agent which would induce a significant reduction in the serum cholesterol level has been found desirable. In a search for such chemotherapeutic agents the products of the invention have been prepared and found to exhibit surprisingly good hypocholesterolemic activity.

The products of the invention can be administered in a wide variety of therapeutic dosages in conventional vehicles as, for example, by oral administration in the form of a tablet as well as by intravenous injection. The dosage of the 3-pyridylmethyl phenoxy(phenylthio and anilino)alkanoate products may be varied over a wide range as, for example, in the form of scored tablets containing 5, 10, 25, 50, 100, 150, 250 and 500 mg. of the active ingredient for the symptomatic adjustment of the dosage to the patient to be treated. These dosages are well below the toxic or lethal dose of the products.

A suitable unit dosage form for the products of the invention can be prepared by mixng 20 mg. of a 3-pyridylmethyl phenoxy(phenylthio or anilino)alkanoate or a suitable acid addition salt thereof, with 174 mg. of lactose and 6 mg. of magnesium stearate and placing the 200 mg. mixture into a No. 2 gelatin capsule. Similarly, by employing more of the active ingredient and less lactose other dosage forms can be put up in No. 2 gelatin capsules and, should it be necessary to mix more than 200 mg. of ingredients together, larger capsules may be employed. Compressed tablets, pills or other desired unit dosages can be prepared to incorporate the compounds of this invention by conventional methods and, if desired, can be made up as elixirs or injectable solutions by methods well known to pharmacists.

The following example is included to illustrate the preparation of a representative dosage form:

EXAMPLE 33

*Dry-filled capsules containing 200 mg. of active ingredient per capsule*

| | Per capsule mg. |
|---|---|
| 3-pyridylmethyl 2-(4-chlorophenoxy)-2-methylpropionate hydrochloride | 20 |
| Lactose | 174 |
| Magnesium stearate | 6 |
| Capsule size No. 2 | 200 |

The 3-pyridylmethyl 2-(4 - chlorophenoxy)-2-methylpropionate hydrochloride is reduced to a No. 60 powder and then the lactose and magnesium stearate are passed through a No. 60 bolting cloth onto the powder and the combined ingredients admixed for 10 minutes and then filled into a No. 2 dry gelatin capsule.

Similar dry-filled capsules can be prepared by replacing the active ingredient of the above example by any of the other novel products of this invention.

It is also within the scope of this invention to combine two or more of the 3-pyridylmethyl phenoxy(phenylthio or anilino)alkanoates (I) of this invention in a unit dosage form or to combine one or more of the compounds with other known hypocholesterolemics or with other desired therapeutic and/or nutritive agents in dosage unit form.

It will be apparent from the foregoing description that the 3-pyridylmethyl phenoxy(phenylthio and anilino)alkanoates (I) of this invention constitute a valuable class of compounds which have not been prepared heretofore. One skilled in the art will also appreciate that the processes disclosed in the above examples are merely illustrative and are capable of wide variation and modification without departing from the spirit of this invention.

What is claimed is:

1. A member selected from the group consisting of a compound having the formula:

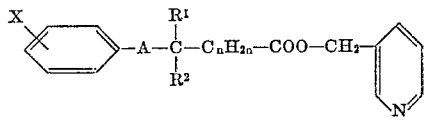

wherein A is a member selected from the group consisting of oxygen, sulfur and imino; $R^1$ and $R^2$ are similar or dissimilar members selected from the group consisting of hydrogen, lower alkyl, halo lower alkyl and, taken together with the carbon to which they are attached, may be joined to form a cycloalkyl ring containing from five to six nuclear carbon atoms, with the proviso that $R^1$ and $R^2$ cannot both be hydrogen at the same time; X is selected from the group consisting of hydrogen, halogen, nitro, alkyl, cycloalkyl, alkenyl, alkoxy, alkylthio, alkylsulfonyl, mononuclear aryl, mononuclear aralkyl, mononuclear aralkoxy, mononuclear arylcarbonylmethyl, mononuclear arylamino, lower alkanoic acid amido and an hydrocarbylene chain containing from three to four carbon atoms between their points of attachment; and $n$ is an integer having a value of zero to four; and a nontoxic, pharmacologically acceptable acid addition salt thereof.

2. A compound having the formula:

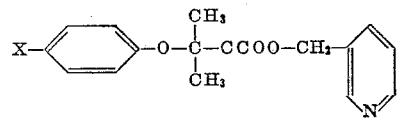

wherein X represents halogen.

3. A compound having the formula:

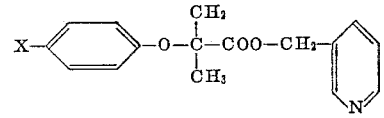

wherein X represents lower alkyl.

4. 3-pyridylmethyl 2-(4-chlorophenoxy)-2-methylpropionate hydrochloride.

5. 3-pyridylmethyl 2-(4-chlorophenoxy)propionate hydrochloride..

6. 3 - pyridylmethyl 2-(3 - trifluoromethylphenoxy)-2-methylpropionate hydrochloride.

References Cited

UNITED STATES PATENTS 3,312,711   4/1967   Koch _____ 260—295

OTHER REFERENCES

Thuillier et al., Bull Soc. Chim. 5, pages 1786–1794 (1960).

JOHN D. RANDOLPH, *Primary Examiner.*

WALTER A. MODANCE, *Examiner.*

A. ROTMAN, *Assistant Examiner.*